(12) United States Patent
Muto et al.

(10) Patent No.: US 7,085,078 B2
(45) Date of Patent: Aug. 1, 2006

(54) COMBINED OPTICAL ELEMENTS

(75) Inventors: Hiroyasu Muto, Saitama (JP); Hiroaki Fujita, Saitama (JP); Yasuhiko Sato, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 11/034,577

(22) Filed: Jan. 13, 2005

(65) Prior Publication Data
US 2005/0152047 A1   Jul. 14, 2005

(30) Foreign Application Priority Data
Jan. 13, 2004   (JP) .............................. 2004-005804
Jan. 13, 2004   (JP) .............................. 2004-005805

(51) Int. Cl.
*G02B 7/02* (2006.01)
(52) U.S. Cl. ...................................... 359/811; 359/754
(58) Field of Classification Search ................. 359/741, 359/754, 796, 804, 808, 811
See application file for complete search history.

(56) References Cited

U.S. PATENT DOCUMENTS 6,747,811 B1 * 6/2004 Kishima et al. ............. 359/719
2004/0130807 A1 * 7/2004 Hattori et al. .............. 359/811

FOREIGN PATENT DOCUMENTS

| JP | 5-070155 | 3/1993 |
|---|---|---|
| JP | 2003-119038 | 4/2003 |

* cited by examiner

*Primary Examiner*—Scott J. Sugarman
*Assistant Examiner*—Darryl J. Collins
(74) *Attorney, Agent, or Firm*—Jordan and Hamburg LLP

(57) ABSTRACT

A compound optical unit has combined optical elements in which two optical elements having convex optical functional surfaces are joined to each other with the optical functional surfaces facing each other, the optical elements being formed of glass. An inner flange adjacent to the optical functional surfaces of each optical element is different in thickness from an outer flange formed outsides the inner flange, the outer flange has a top face formed higher then the optical functional surface, and each of the top faces of the outer flanges are jointed to each other.

11 Claims, 4 Drawing Sheets

COMBINED OPTICAL ELEMENTS

BACKGROUND OF THE INVENTION

1. Field of the Invention

The present invention relates to miniature combined optical elements formed of glass.

2. Description of the Related Art

Conventionally, optical elements formed of glass are press-formed by placing a heated and softened glass material in a molding die and then heating and pressing the material. In the case where such press-formed optical elements are used for optical systems for reading compact discs (CD), the optical elements have a numerical aperture (NA) of 0.45 so that a laser beam has a small beam spot. The numerical aperture (NA) indicates a limit of light condensation when the optical system has no aberration. Red laser light has been used for conventional CDs with a laser wavelength of 780 nm. Such laser light is focused by optical elements.

Optical elements molded by the conventional molding technique can handle a laser wavelength of 780 nm or more and an NA of about 0.45 or less for reading CDs. However, when there is a need to further focus light to have a smaller beam spot, it is difficult for the optical elements to respond to the need. The NA is a value indicating the size of an aperture pupil with a constant focal length. The larger NA, the more focused laser light, achieving high-density recording on discs Recently violet laser light (blue laser) has been used, which is shorter in wavelength than red laser light, and optical elements having an NA of 0.6 or larger are used to read records on discs. When such optical elements are molded by the conventional press forming technique, a convex portion serving as an optical functional surface has a curved surface with a small radius of curvature (surface has a large curvature), so that the sharply curved surface is formed and the optical elements have to be small in size as much as possible in view of the installation space of the optical elements, resulting in difficult molding. It is difficult to work dies for molding such optical elements, and transfer is poor on a boundary between a flange and the convex portion having the sharply curved surface. Another technique is known in which instead of a single optical element, two optical elements are mounted in a lens-barrel and a combination of the two optical elements enables a high numerical aperture for further condensing laser light. However, in this case, it is necessary to use a spacer ring to adjust an interval of the two optical elements in the optical axis direction, thereby increasing the number of components with poor accuracy. As an example of the two combined optical elements, the following configuration is available: as shown in FIG. 1, two optical elements 32 and 33 which are formed of glass and have convex optical functional surfaces 30 and 31 are combined with the optical functional surfaces 30 and 31 facing each other. In this case, the optical functional surface 31 of the optical element 33 is protruded more than a join surface 34, resulting in a larger amount of press on the optical functional surface 32 of the other optical element 30 (to increase NA), poor transfer, and low accuracy. When grinding is performed to reduce the thickness of the flange of the optical element 33, even on the opposite side from the optical functional surface 31, it is necessary to hold the optical functional surface 31 to perform grinding, so that the protruding optical functional surface 31 becomes an obstacle during the holding for grinding.

SUMMARY OF THE INVENTION

It is an object of the present invention to provide combined optical elements formed of glass, in which the top faces of flanges formed on the two optical elements are joined to each other, so that an optical system with a high numerical aperture is formed with out using a spacer ring, miniaturization is achieved, and optical axes are aligned with ease.

In order to attain the object, the present invention provides combined optical elements, in which two optical elements having convex optical functional surfaces are joined to each other with the optical functional surfaces facing each other, the optical elements being formed of glass, wherein an inner flange adjacent to the optical functional surface of each optical element is different in thickness from an outer flange formed outside the inner flange, each outer flange has a top face formed higher than the optical functional surface, and each top faces of the outer flanges are jointed to each other.

According to the present invention, in the combined optical elements, the two optical elements having the convex optical functional surfaces are joined to each other with the optical functional surfaces facing each other, the optical elements being formed of glass, wherein the inner flange adjacent to the optical functional surface of each optical element is different in thickness from the outer flange formed outside the inner flange, each outer flange has a top face formed higher than the optical functional surface, and each top faces of the outer flanges are jointed to each other. Thus, unlike the case where one of two optical elements has an convex optical functional surface protruding more than the top face of an outer flange, the following problem is avoided: when the convex optical functional surface is press formed during the molding of the other optical element, an amount of press on a glass material increases, resulting in difficult or poor molding. Hence, miniaturization can be achieved. While the increase in the NA of a single optical element is limited, a combination of two optical elements can readily increase in NA. Further, by accurately setting a distance between the outer flange and the optical functional surface during molding, the top faces of the outer flanges of the two optical elements can be accurately joined to each other and thus the optical axes can be readily aligned with each other. Particularly since the optical functional surface does not protrude more than a join face, excessive pressure is not applied to one of the optical elements, excellent transfer and high accuracy are obtained, and the optical functional surfaces do not interfere with an operation of reducing the inner flanges in thickness by grinding.

DETAILED DESCRIPTION OF THE PREFERRED EMBODIMENTS

Figure 2:
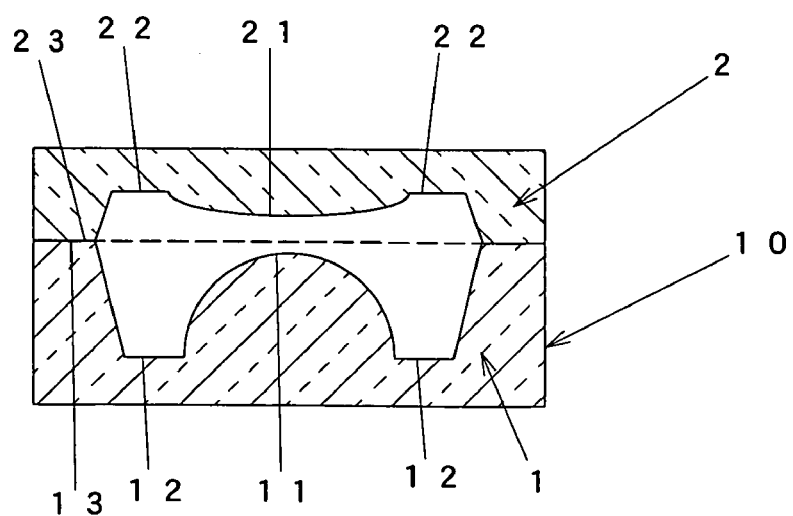
FIG. 2 is a sectional view showing a preferred embodiment of the present invention.

FIG. 2 is a sectional view showing an embodiment of the present invention. Two optical elements 1 and 2 which are formed of glass and have convex optical functional surfaces 11 and 21 are joined to each other with the optical functional surfaces 11 and 21 facing each other. Inner flanges 12 and 22 adjacent to the optical functional surfaces 11 and 21 of the optical elements 1 and 2 are different in thickness from outer flanges 13 and 23 formed outside the inner flanges. Each top faces of the outer flanges 13 and 23 are formed higher than the optical functional surfaces 11 and 21, and each top faces of the outer flanges 13 and 23 are jointed to each other.

Figure 1:
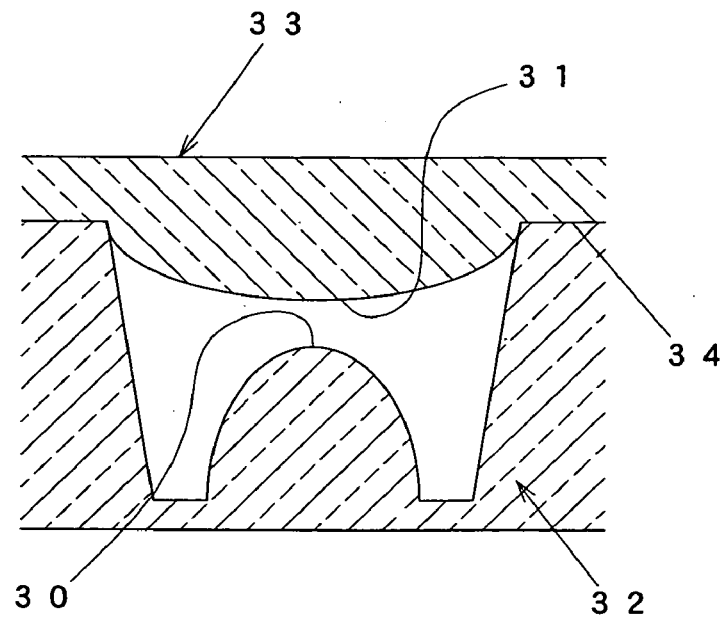
FIG. 1 is a sectional view showing a conventional example.
Figure 3:
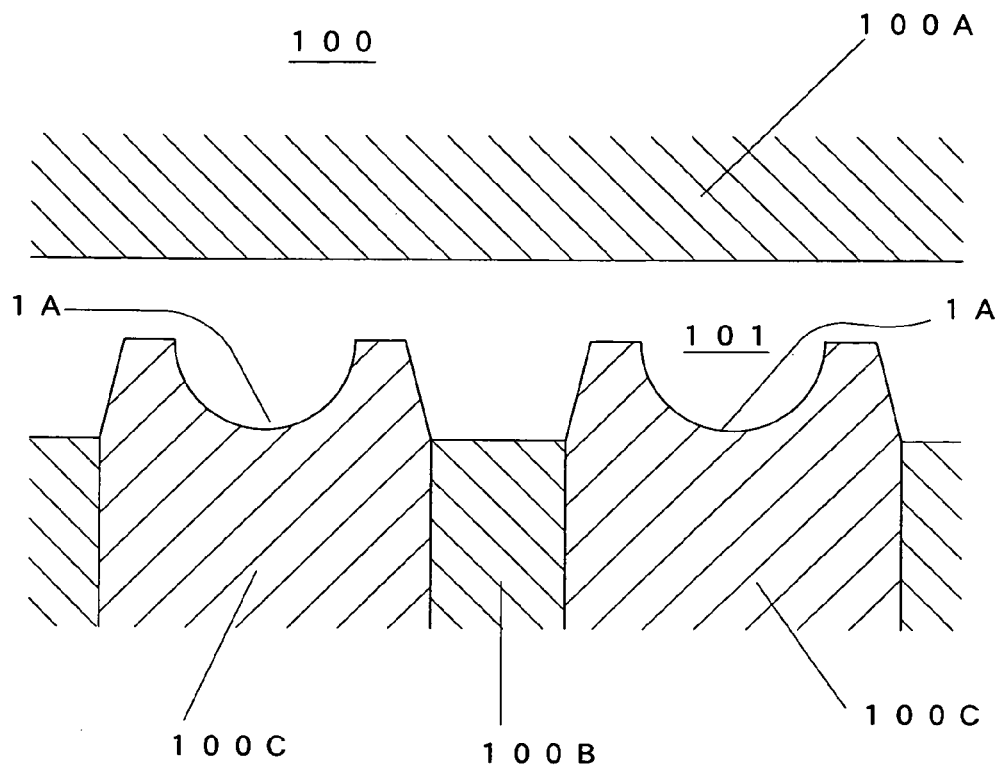
FIG. 3 is a sectional view showing an example of a press-molding die.

FIG. 3 shows a press-molding die 100 for molding the glass element 1 shown in FIG. 1. The press-molding die 100 is constituted of a cope 100A, a drag 100B, and cores 100C provided in the drag 100B. A concave portion 1A corresponding to the shape of the convex optical functional surface 11 is formed in the core 100C. A plurality of optical elements 1 can be press-formed by the press-molding die 100 at a time. A glass material is placed on a cavity 101 and the press-molding die 100 is fastened to press the glass material, so that a product having a plurality of continuous optical functional surfaces 11 is molded.

Figure 4:
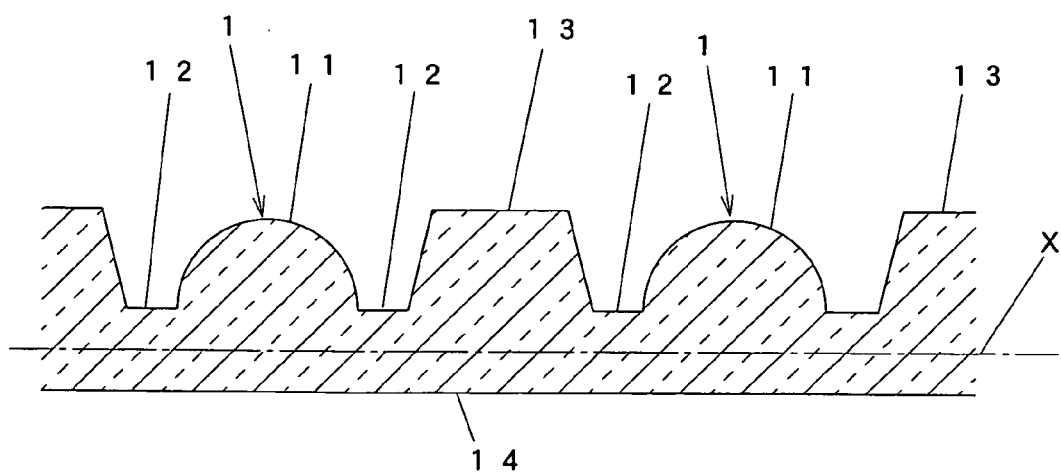
FIG. 4 is a sectional view showing a product molded by the die of FIG. 3.

FIG. 4 shows the product molded by the press-molding die 100 shown in FIG. 3. A flat surface 14 on the opposite side from the optical functional surfaces 11 is ground to a position indicated by a line X, so that the thickness of the inner flange 12 can be a desired thickness or less. It is preferable for the inner flange 12 to have a final thickness of less than 0.3 mm. This is because the installation space of an optical system is limited in an optical reader and there is a need for the miniaturization of an apparatus.

FIGS. 3 and 4 described the molding method of the optical element 1. The molding method is also applicable to the other optical element 2 to be combined. In this case, the concave portion 1A of the core 100C is designed such that the convex optical functional surface 21 is smaller in curvature than the optical functional surface 11 of the other optical element 1. On the optical elements 1 and 2, the convex optical functional surfaces 11 and 21 are formed lower than the top faces of the outer flanges 13 and 23. The product shown in FIG. 4 is cut on the outer flanges 13, so that the optical elements 1 are obtained one by one.

Figure 5:
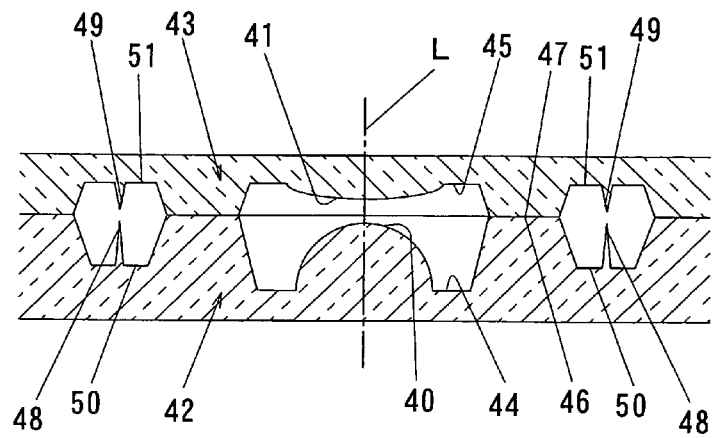
FIG. 5 is a sectional view showing another embodiment.

FIG. 5 is a sectional view showing another embodiment in which optical elements 42 and 43 are joined to each other. The optical elements 42 and 43 have convex optical functional surfaces 40 and 41 molded by press forming a glass material. On a position somewhat higher than the tops of the optical functional surfaces 40 and 41, the top faces of outer flanges 46 and 47 are formed on the optical elements. The outer flanges 46 and 47 are provided outside flanges 44 and 45 adjoining the optical functional surfaces 40 and 41. When the first optical element 42 and the second optical element 43 are joined together, it is necessary to cause the optical functional surfaces 40 and 41 to face each other and align the optical axes of the optical functional surfaces. Further, the optical functional surfaces 40 and 41 have different convex shapes. Pointed convex portions 48 and 49 for positioning are formed on at least two points which are positioned outside the outer flanges 46 and 47 and at a predetermined distance from an optical axis L of the optical functional surfaces 40 and 41 of the first and second optical elements 42 and 43. The tops of the convex portions 48 and 49 are somewhat lower than the top faces of the outer flanges 46 and 47. The convex portion 48, the optical axis of the optical functional surface 40, the convex portion 49, and the optical axis of the optical functional surface 41 are formed with high positioning accuracy. By aligning the convex portions 48 and 49 on the two points, the optical axis of the optical functional surface 40 and the optical axis of the optical functional surface 41 are aligned with each other. The focus positions of the tips of the convex portions 48 and 49 are aligned with each other on the same optical axis by a microscope, so that the optical axes of the optical functional surfaces 40 and 41 are aligned with each other. Further, flanges 50 and 51 are formed adjacently to the convex portions 48 and 49.

Figure 6:
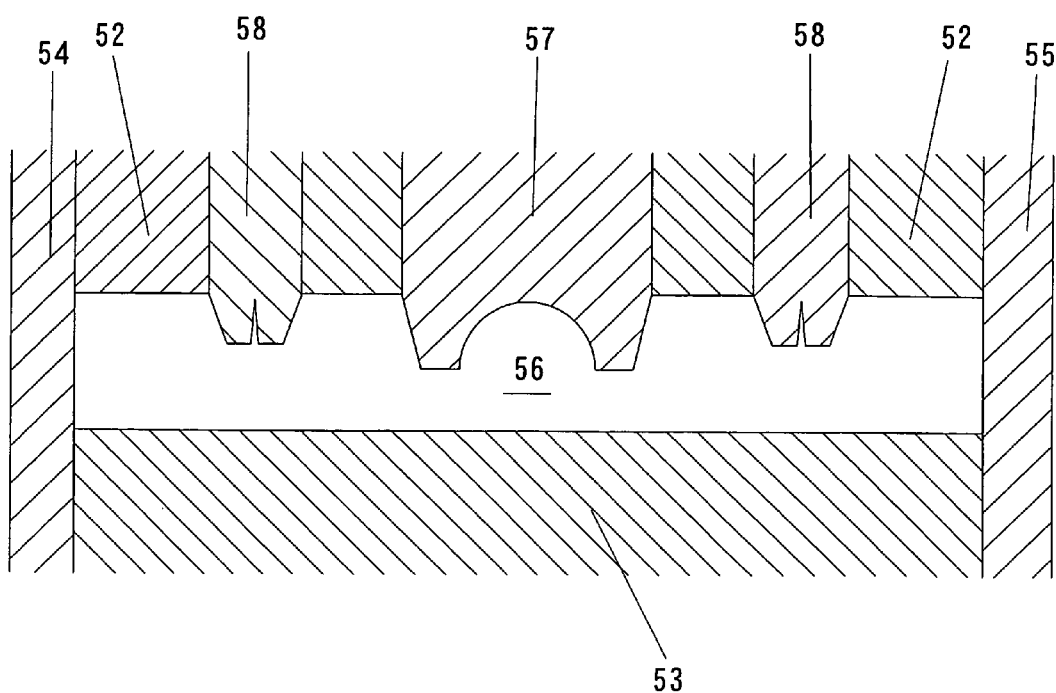
FIG. 6 is a sectional view showing an example of a press-molding apparatus for molding an optical element.

FIG. 6 shows an example of an apparatus for molding the optical elements 42 and 43. A drag 53 is formed so as to face a cope 52, side dies 54 and 55 are disposed on both sides, and a glass material is placed in a space surrounded by the dies, that is, in a cavity 56. The cope 52 comprises a first core 57 and second cores 58. The first core 57 is provided for molding the optical functional surfaces 40 and 41 and flanges 44 and 45. Since the optical functional surfaces 40 and 41 of the first optical element 42 and the second optical element 43 are different in shape, the first core 57 is also varied in shape. The second cores 58 are provided for molding the convex portions 48 and 49 for positioning. The two optical elements molded by the press-molding apparatus are used, and the optical elements are joined to each other with the optical functional surfaces 40 and 41 facing each other. In this joining operation, in order to align the optical axes L of the optical functional surfaces 40 and 41, the optical axes of the convex portions 48 and 49 are aligned with each other using a microscope.

Figure 7:
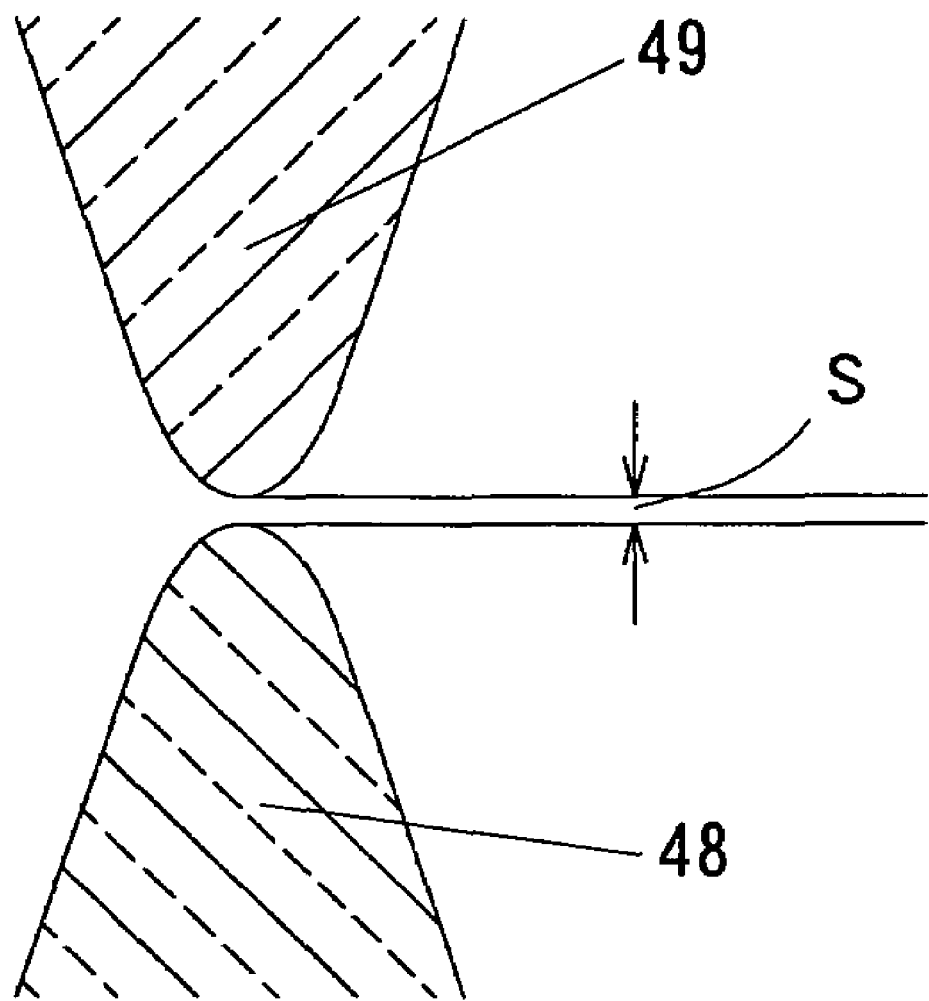
FIG. 7 is an enlarged sectional view showing convex portions in a joined state.

FIG. 7 is an enlarged sectional view showing the convex portions 48 and 49. A distance S between the tops, that is, an interval between the convex portions 48 and 49 is 0.026 mm or less. When the distance S is large, the top of the convex portion 48 and the top of the convex portion 49 are deviated from the focus depth of a microscope optical system, so that it becomes difficult to perform focusing using a microscope and an error is likely to occur. Further, it is preferable that the tips of the convex portions 48 and 49 be 0.02 mm or less in radius of curvature. With this radius of curvature, the tops can be smaller in spot diameter and focusing can be performed with ease. After the first and second optical elements 42 and 43 are joined to each other, the convex portions 48 and 49 are cut off.

After the optical elements 42 and 43 are press formed by the press-molding apparatus shown in FIG. 6, it is preferable to grind flat surfaces opposite from the optical functional surfaces 40 and 41 such that the thicknesses of the flanges 44 and 45 are equal to or smaller than a predetermined thickness. For example, the flanges 44 and 45 are 0.3 mm or less in thickness. A thickness of 0.05 to 0.2 mm is preferable. The minimum thickness is desirable in consideration of an installation space. When the flanges 44 and 45 are less than 0.3 mm in thickness at the start of the press forming, the glass material may be damaged. Therefore, the flanges 44 and 45 are molded with a thickness of 0.3 mm or larger during the press forming, and the flat surfaces opposite from the optical functional surfaces 40 and 41 are ground after the press forming to reduce the thicknesses of the flanges 44 and 45.

According to the embodiment shown in FIGS. 5 and later, the optical elements 42 and 43 are joined to each other with the convex optical functional surfaces 40 and 41 facing each other. The convex optical functional surfaces 40 and 41 are molded by press forming the glass material. In the combined optical elements, the outer flanges 46 and 47 have top faces formed somewhat higher than the tops of the optical functional surfaces 40 and 41 so as to constitute the first and second optical elements 42 and 43. The outer flanges 46 and 47 are provided outside the flanges 44 and 45 adjoining the optical functional surfaces 40 and 41. The pointed convex portions 48 and 49 for positioning are formed on at least two points which are positioned outside the outer flanges 46 and 47 and at a predetermined distance from the optical axes of the optical functional surfaces 40 and 41 of the first and second optical elements 42 and 43. The convex portions 48 and 49 have tips somewhat lower than the top faces of the outer flanges 46 and 47. The tips of the convex portions 48 and 49 for positioning that are formed on at least two points are positioned on the same optical axis while the outer flanges 46 and 47 of the first and second optical elements 42 and 43 are in contact with each other, so that the optical axes of the optical functional surfaces 40 and 41 are aligned with each other. Further, the outer flanges 46 and 47 of the first and second optical elements 42 and 43 are joined together in this state. Thus, it is possible to quickly align the optical axes of the optical functional surfaces 40 and 41 of the two optical elements 42 and 43 with ease. In this alignment of the optical axes, focusing is obtained on the convex portions 48 and 49 by using a microscope. Further, it is possible to achieve a high numerical aperture which has been difficult to obtain with a single optical element.

The invention claimed is:

1. A compound optical unit, comprising:
    two optical elements including first and second optical elements;
    each optical element including an outer flange, each outer flange having a top surface formed higher than the optical functional surface;
    the top surface of the first element being disposed against the top surface of the second element;
    said optical elements having convex optical functional surfaces joined to each other with the optical functional surfaces facing each other, the optical elements being formed of glass,
    an inner flange adjacent to the optical functional surface of each optical element and having a different thickness than the outer flange formed outside the inner flange, and
    top faces of the outer flanges being jointed to each other.

2. The compound optical unit according to claim 1, further comprising a press forming surface on a side having the convex optical functional surface of at least one of the optical elements, and a grinding surface on an opposite side from the press forming surface,
    wherein the inner flange adjacent to the optical functional surface is less than 0.3 mm in thickness.

3. The compound optical unit according to claim 1, wherein the optical element has a numerical aperture (NA) of 0.6 or larger.

4. A compound optical unit comprising:
    first and second optical elements joined to each other with convex optical functional surfaces facing each other, the convex optical functional surfaces being molded by press forming a glass material,
    an outer flange having a top face formed higher than a top of the optical functional surfaces so as to constitute the first and second optical elements, the outer flange being provided outside a flange adjoining the optical functional surfaces,
    pointed convex portions for positioning on at least two points which are positioned outside the outer flange and at a predetermined distance from optical axes of the optical functional surfaces of the first and second optical elements, the convex portions having tips lower than the top face of the outer flange, and
    the tips of the convex positioning portions being positioned on the same optical axis while the outer flanges of the first and second optical elements are in contact with each other, so that optical axes of the optical functional surfaces are aligned with each other, and the outer flanges of the first and second optical elements are joined together in this state.

5. The compound optical unit according to claim 4, wherein the convex portions for positioning are arranged at a spacing of 0.026 mm or less when the first and second optical elements are joined to each other.

6. The compound optical unit according to claim 4, wherein grinding is performed on a surface opposite from the convex optical functional surfaces after the glass material is press formed.

7. The compound optical unit according to claim 4, wherein the tip of the convex portion is 0.02 mm or less in radius of curvature.

8. The compound optical unit according to claim 2, wherein the optical element has a numerical aperture (NA) of 0.6 or larger.

9. The compound optical unit according to claim 5, wherein grinding is performed on a surface opposite from the convex optical functional surfaces after the glass material is press formed.

10. The compound optical unit according to claim 5, wherein the tip of the convex portion is 0.02 mm or less in radius of curvature.

11. The compound optical unit according to claim 6, wherein the tip of the convex portion is 0.02 mm or less in radius of curvature.

* * * * *